March 22, 1966 L. L. KRETT 3,241,698

SIDE SHIFTING CARRIAGE FOR LIFT TRUCK

Filed Feb. 27, 1964

Inventor
Lee L. Krett
By Charles C. Schwab
Attorney

United States Patent Office 3,241,698
Patented Mar. 22, 1966

3,241,698
SIDE SHIFTING CARRIAGE FOR LIFT TRUCK
Lee L. Krett, Dolton, Ill., assignor to Allis-Chalmers
Manufacturing Company, Milwaukee, Wis.
Filed Feb. 27, 1964, Ser. No. 347,770
3 Claims. (Cl. 214—730)

This invention relates to an improved side shifting carriage for a lift truck.

It is an object of this invention to provide a side shifting carriage wherein the side shifted portion of the carriage slides on parallel guide surfaces which are normal to the resultant of forces created by the weight of the side shifted portion and the payload carried thereby.

It is a further object of this invention to provide a side shifting carriage which requires less longitudinal space for the side shifting mechanism than heretofore required.

It is a further object of this invention to provide a side shifting carriage having the characteristics mentioned in the preceding objects and which requires a minimum of parts thereby reducing the cost and simplifying servicing.

These and other objects and advantages of this invention will be apparent on reading the following description in conjunction with the drawings in which.

Figure 1:
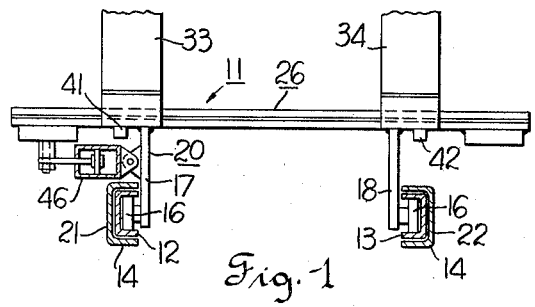
FIG. 1 is a top view of the side shifting carriage of this invention.
Figure 2:
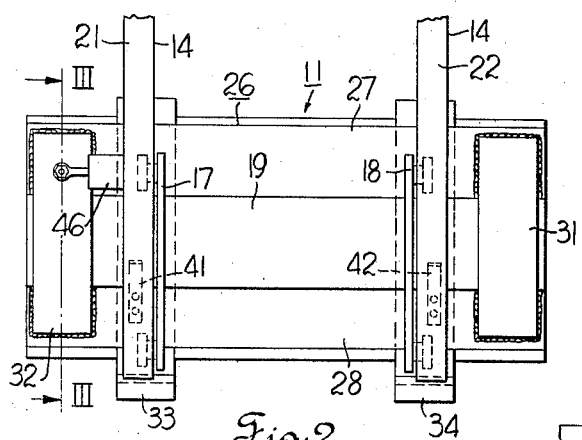
FIG. 2 is a rear view of the side shifting carriage shown in FIG. 1.
Figure 3:
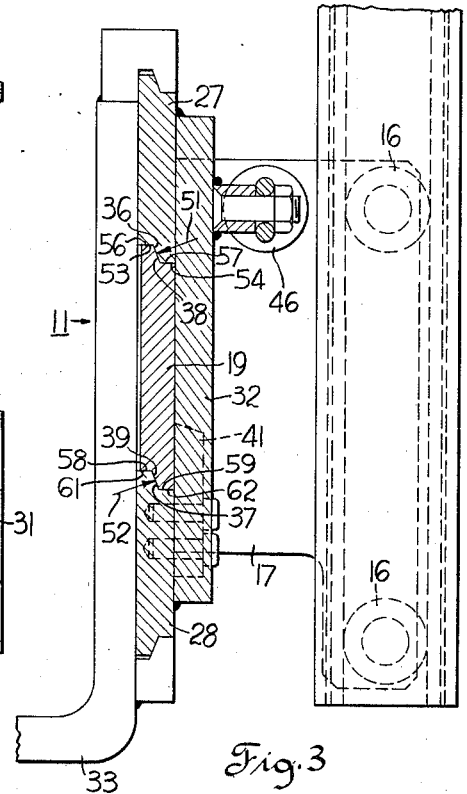
FIG. 3 is a section taken on the line III—III of FIG. 2.

Referring to FIGS. 1, 2 and 3 the side shifting carriage 11 is mounted on the inner channels 12, 13 of the truck mast 14 by rollers 16 journaled on a pair of forwardly extending arms 17, 18. The arms 17, 18 are a part of a vertically movable support 20 which also includes a transversely extending guide plate member 19 welded to the forward ends of the arms 17, 18. The outer channels 21, 22 are secured to a lift truck not shown in a conventional manner. The vertically movable carriage support 20 is raised and lowered relative to the mast by conventional power means, not shown. The side shifting portion 26 of the carriage 11 includes transversely extending slides 27, 28 which are interconnected by flat end plates 31, 32 welded thereto. A pair of load supporting members 33, 34 in the form of forks are connected to the shiftable carriage portion 26 in a conventional manner.

The transverse guide plate 19 presents an upwardly and rearwardly facing inclined guide surface 36 and a downwardly and forwardly facing inclined guide surface 37 which are parallel to one another and each intersect a transversely extending vertical plane at an acute angle. Complementary slide surfaces 38, 39 are formed on the slides 27, 28 and are in thrust transmitting relation to the guide surfaces 36, 37 on plate 19. The guide and slide surfaces are designed to be approximately normal to the resultant forces created by the weight of the side shifting portion 26 and the payload acting through the load center. The resultant force couple is illustrated by arrows 51, 52. Horizontal bearing surfaces 53, 54 on slide 27 mate with horizontal bearing surfaces 56, 57 to transfer the vertical load component of the payload to the support 19. Surfaces 58, 59 and 61, 62 cooperate as guide surfaces.

Additional guide members 41, 42 may be secured by cap screws to the lower guide 28. Power means in the form of a double acting hydraulic jack 46 is provided between support 20 and the side shifting portion 26. Appropriate control means, not shown, are provided for the double acting hydraulic jack 46 so that the side shifting portion 26 can be shifted a few inches in either direction to compensate for minor misalignments between the load to be received on the forks and the forks themselves.

Figure 4:
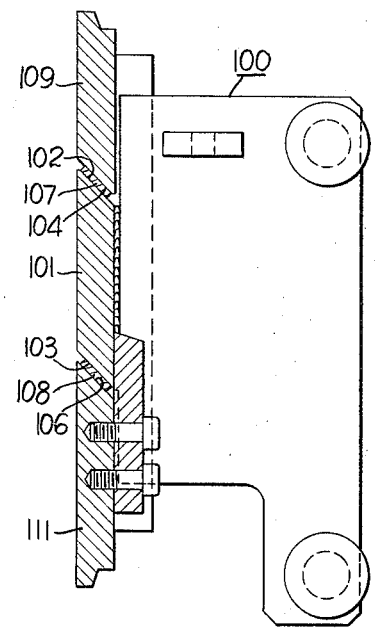
FIGS. 4 and 5 are side views of other embodiments of this invention.

In FIG. 4, an alternate construction is illustrated wherein the guide plate 101 of the support 100 presents inclined parallel surfaces 102, 103 in complementary thrust transmitting relation to wear strip slide surfaces 104, 106 formed on wear strips 107, 108, attached to slides 109, 111.

Figure 5:
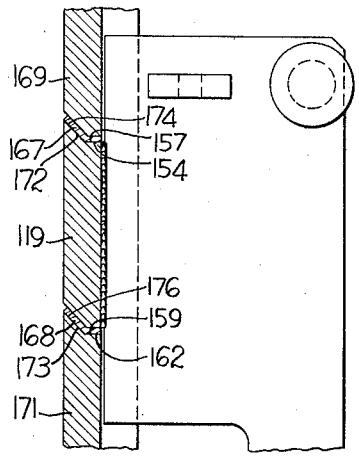

In FIG. 5, an alternate construction is illustrated wherein only two sets of horizontal bearing surfaces 154, 157 and 159, 162 are employed. A pair of V-section wear strips 167, 168 are secured to slides 169, 171, respectively, and present inclined guide surfaces 172, 173 in thrust transmitting relation to guide surfaces 174, 176 on plate 119.

The construction of FIG. 5 is less expensive to manufacture than the embodiment of FIG. 3.

From the foregoing description it is apparent that I have provided an extremely simple side shifting arrangement which occupies a minimum of longitudinal space by virtue of the vertical alignment between guide plate 19 and slides 27, 28.

The embodiments of the invention in which an exclusive property or privilege is claimed are defined as follows:

1. A side shifting carriage structure for a lift truck of the type having a pair of laterally spaced upright channel members comprising:
    a vertically movable support including
        a pair of forwardly extending and laterally spaced arms,
        means at the rear ends of said arms adapted for connecting said arms to said channels for vertical reciprocal movement,
        a transversely extending and vertically disposed guide plate rigidly secured to the forward ends of said arms,
            an upwardly and rearwardly facing inclined guide surface on the upper edge of said guide plate,
            a downwardly and forwardly facing inclined guide surface on the lower edge of said guide plate, said guide surfaces being parallel to one another and each intersecting a transverse vertical plane at an acute angle,
    a laterally shiftable portion having upper and lower slides in vertical alignment with said guide plate and presenting upper and lower inclined parallel slide surfaces in vertically aligned relationship one directly above the other and in complementary thrust transmitting relation to said guide surfaces, respectively,
    power means interposed between said support and said portion for shifting the latter laterally relative to said support and
    load supporting members connected to said portion for movement therewith.

2. The structure set forth in claim 1 and further comprising complementary horizontal bearing surfaces on the bottom of said upper slide and on the top of said guide plate, said bearing surfaces being in thrust transmitting engagement with one another.

3. A side shifting carriage structure for a lift truck of the type having a pair of laterally spaced upright channel members comprising:
    a vertically movable support including
        a pair of forwardly extending and laterally spaced arms,
            means at the rear ends of said arms adapted for connecting said arms to said channels for vertical reciprocal movement,
        a transversely extending and vertically disposed guide plate rigidly secured to the forward ends of said arms, an upwardly and rearwardly facing inclined guide surface on the upper edge of said guide plate, a downwardly and forwardly facing inclined guide surface on the lower edge of said guide plate, said guide surfaces being parallel to one another and each intersecting a transverse vertical plane at an acute angle, a laterally shiftable portion having upper and lower slides in vertical alignment with said guide plate and presenting upper and lower slide surfaces in complementary thrust transmitting relation to said guide surfaces, respectively, complementary horizontal bearing surfaces on the bottom of said upper slide and on the top of said guide plate, said bearing surfaces being in thrust transmitting engagement with one another, power means interposed between said support and said portion for shifting the latter laterally relative to said support and load supporting members connected to said portion for movement therewith.

References Cited by the Examiner

UNITED STATES PATENTS

| | | |
|---|---|---|
| 2,822,101 | 2/1958 | Schenkelberger _____ 214—730 |
| 2,909,299 | 10/1959 | Quayle _____ 214—730 X |

FOREIGN PATENTS

| | | |
|---|---|---|
| 1,000,287 | 1/1957 | Germany. |
| 930,077 | 7/1963 | Great Britain. |
| 964,161 | 7/1964 | Great Britain. |

GERALD M. FORLENZA, *Primary Examiner.*

R. B. JOHNSON, *Assistant Examiner.*